US011272574B2

(12) United States Patent
Shrestha et al.

(10) Patent No.: US 11,272,574 B2
(45) Date of Patent: *Mar. 8, 2022

(54) METHODS TO HANDLE SCHEDULING REQUESTS FOR ULTRA-RELIABLE LOW LATENCY COMMUNICATION (URLLC) IN NEW RADIO (NR) SYSTEMS

(71) Applicant: Apple Inc., Cupertino, CA (US)

(72) Inventors: Bharat Shrestha, Hillsboro, OR (US); Yujian Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,291

(22) Filed: Jul. 24, 2020

(65) Prior Publication Data

US 2020/0359457 A1 Nov. 12, 2020

Related U.S. Application Data

(63) Continuation of application No. 16/273,802, filed on Feb. 12, 2019, now Pat. No. 10,764,962.

(60) Provisional application No. 62/631,322, filed on Feb. 15, 2018.

(51) Int. Cl.
*H04W 88/06* (2009.01)
*H04W 80/02* (2009.01)
*H04W 72/10* (2009.01)
*H04W 76/27* (2018.01)
*H04W 72/12* (2009.01)
*H04W 28/02* (2009.01)
*H04W 72/14* (2009.01)
*H04L 5/00* (2006.01)
*H04W 72/04* (2009.01)

(52) U.S. Cl.
CPC ............... *H04W 88/06* (2013.01); *H04L 5/00* (2013.01); *H04W 28/0278* (2013.01); *H04W 72/10* (2013.01); *H04W 72/1242* (2013.01); *H04W 72/1284* (2013.01); *H04W 72/14* (2013.01); *H04W 76/27* (2018.02); *H04W 80/02* (2013.01); *H04W 72/042* (2013.01)

(58) Field of Classification Search
None
See application file for complete search history.

(56) References Cited

U.S. PATENT DOCUMENTS 10,764,962 B2 * 9/2020 Shrestha ........... H04W 72/1242
2010/0034147 A1 2/2010 Ho et al.
2018/0014322 A1 1/2018 Loehr et al.

* cited by examiner

*Primary Examiner* — Alex Skripnikov
(74) *Attorney, Agent, or Firm* — Kowert, Hood, Munyon, Rankin & Goetzel, P.C.

(57) ABSTRACT

Embodiments of a User Equipment (UE) and methods of communication are generally described herein. The UE may, if a regular buffer status report (BSR) is triggered and a logical channel scheduling request (SR) delay timer is not running, and if available uplink shared channel (UL-SCH) data resources do not meet one or more logical channel prioritization (LCP) mapping restrictions configured for a logical channel of uplink data: trigger a scheduling request to request UL-SCH data resources for a new transmission of uplink data. Currently pending SRs and BSRs may not be cancelled after assembly of a medium access control (MAC) protocol data unit (PDU), but may be cancelled at a later time when a MAC PDU including a BSR is transmitted.

20 Claims, 14 Drawing Sheets

1300

```
-- ASN1START
-- TAG-LOGICAL-CHANNEL-CONFIG-START

LogicalChannelConfig ::=        SEQUENCE {
    ul-SpecificParameters       SEQUENCE {
        priority                INTEGER (1..16),
        prioritisedBitRate      ENUMERATED {kBps0, kBps8, kBps16, kBps32, kBps64,
kBps128, kBps256, kBps512,
                                    kBps1024, kBps2048, kBps4096, kBps8192, kBps16384,
kBps32768, kBps65536, infinity},
        bucketSizeDuration      ENUMERATED {ms50, ms100, ms150, ms300, ms500, ms1000,
spare2, spare1}, -- FFS: Detailed handling of restrictions (UP email discussion)
        -- Defined in L1 parameters but the value range must be checked.
        allowedSubCarrierSpacing    SubcarrierSpacing
                OPTIONAL, allowedTiming               TYPE_FFS
                OPTIONAL,
        logicalChannelGroup         INTEGER (0..maxLCid)
                OPTIONAL, logicalChannelSR-Mask       BOOLEAN, logicalChannelSR-DelayTimerApplied  BOOLEAN
    }
                OPTIONAL,   -- Cond UL -- other parameters
    prioritizedSchedulingRequest    ENUMERATED {true}    OPTIONAL,   -- Need R
}

-- TAG-LOGICAL-CHANNEL-CONFIG-STOP
-- ASN1STOP
```

FIG. 13

METHODS TO HANDLE SCHEDULING REQUESTS FOR ULTRA-RELIABLE LOW LATENCY COMMUNICATION (URLLC) IN NEW RADIO (NR) SYSTEMS

PRIORITY CLAIM

This application is a continuation of U.S. patent application Ser. No. 16/273,802, filed Feb. 12, 2019, entitled "Methods to Handle Scheduling Requests for Ultra-Reliable Low Latency Communication (URLLC) in New Radio (NR) Systems", which claims priority under 35 USC 1 19(e) to U.S. Provisional Patent Application Ser. No. 62/631,322, filed Feb. 15, 2018, which are incorporated by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to ultra-reliable low latency communication (URLLC) techniques.

BACKGROUND

Base stations and mobile devices operating in a cellular network may exchange data. As demand for mobile services and high data rates increases, various challenges related to reliability and capacity may arise. In an example scenario, a large number of users may demand access to the network. In another example scenario, performance requirements may be more demanding for new systems and/or new applications in comparison to legacy systems and/or legacy applications. Examples of such performance requirements may include latency, reliability and/or others. Various techniques used in these and other scenarios may become challenging, including exchanging of control information and/or performance information between the base stations and mobile devices. Accordingly, there is a general need for methods to enable such techniques in these and other scenarios.

BRIEF DESCRIPTION OF THE DRAWINGS

FIG. 13 illustrates an example information element (IE) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
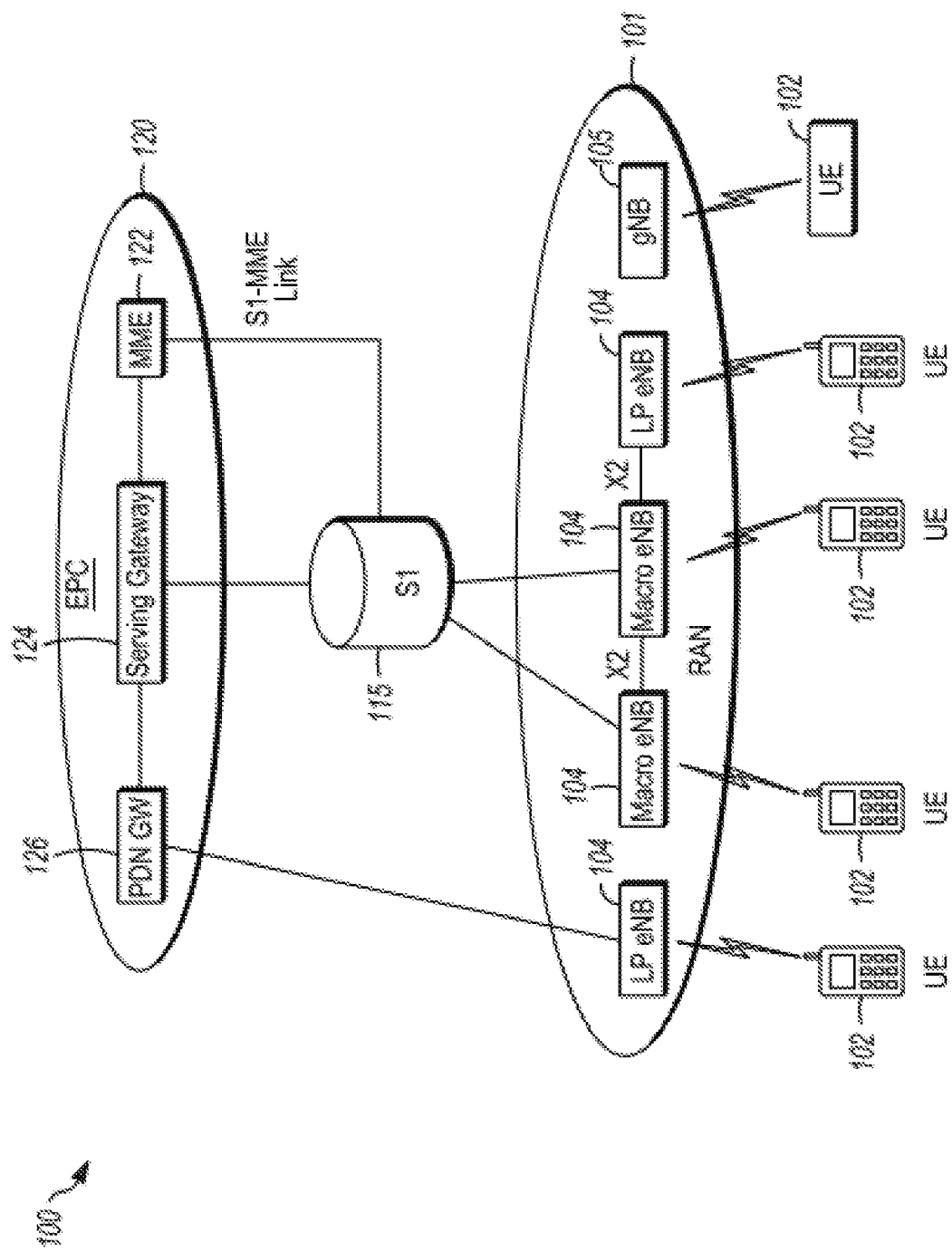
FIG. 1A is a functional diagram of an example network in accordance with some embodiments.
Figure 1B:
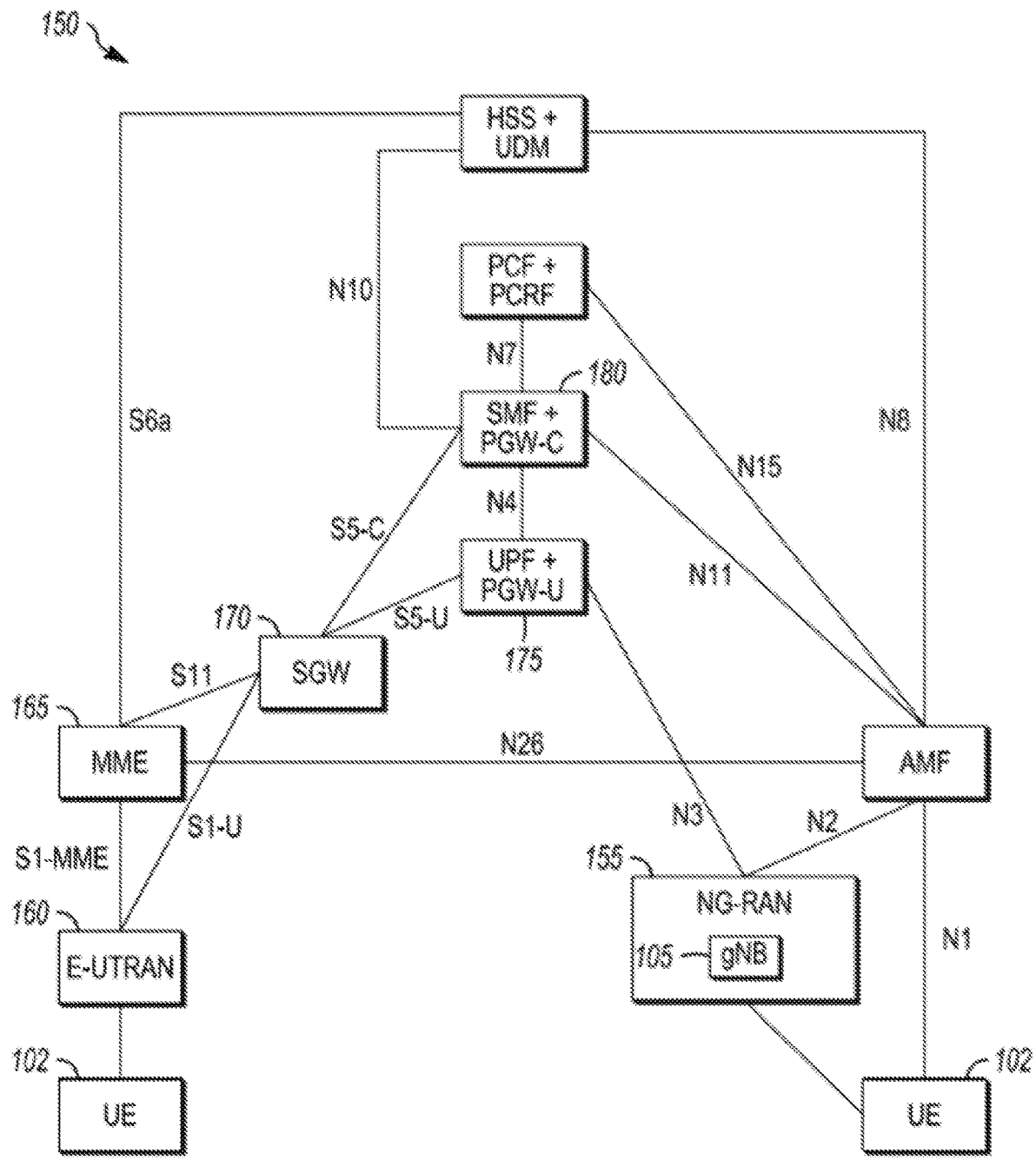
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells.

Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
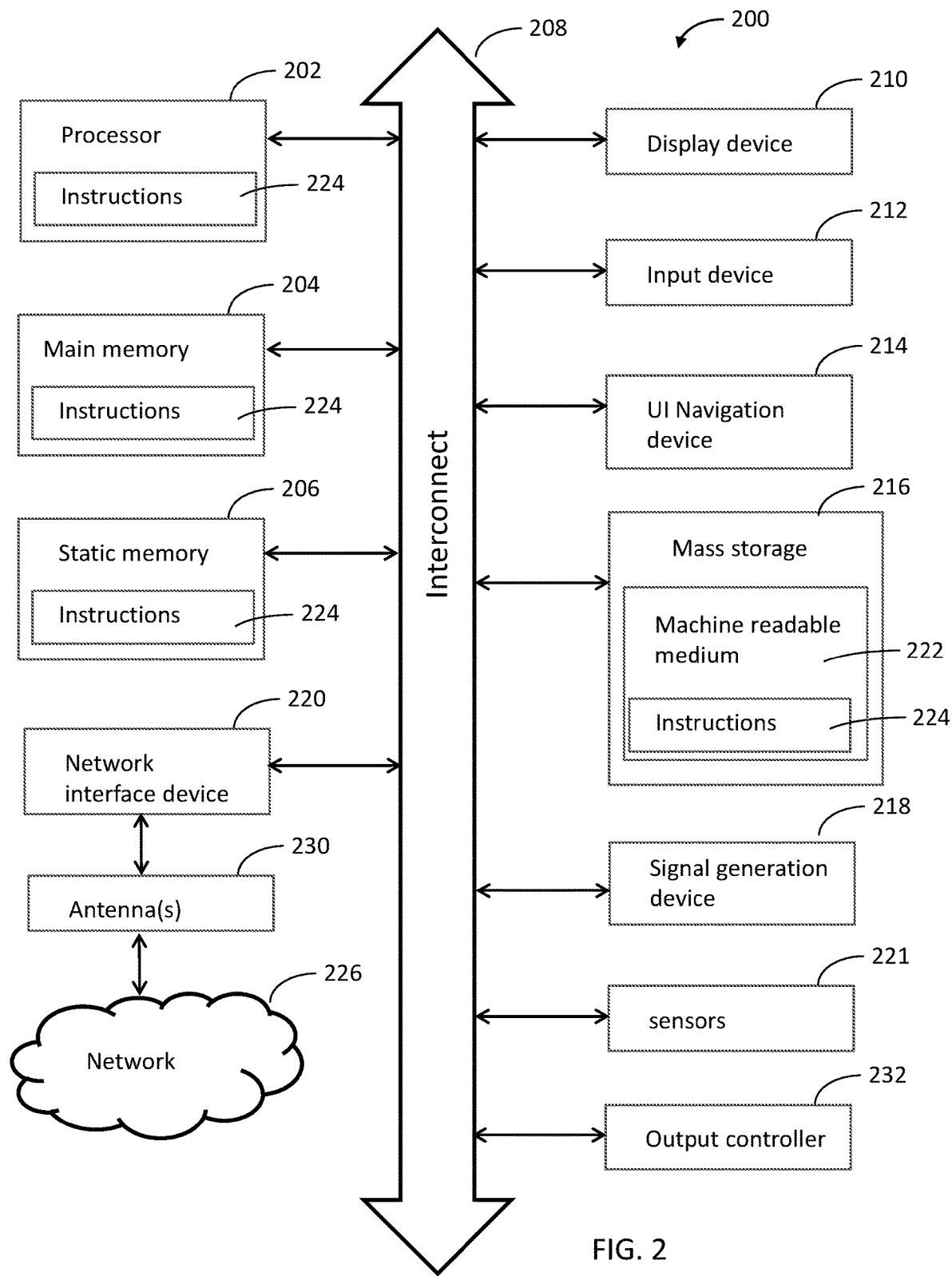
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
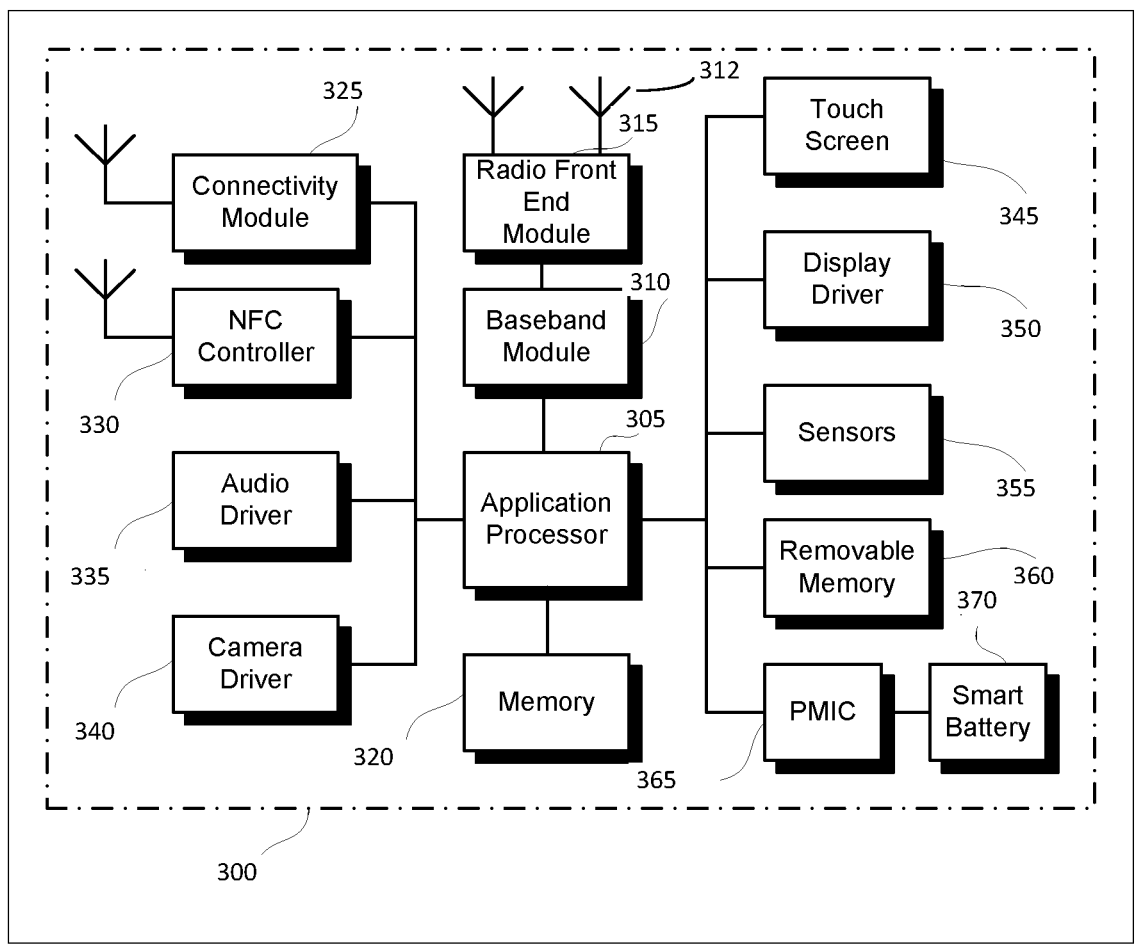
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
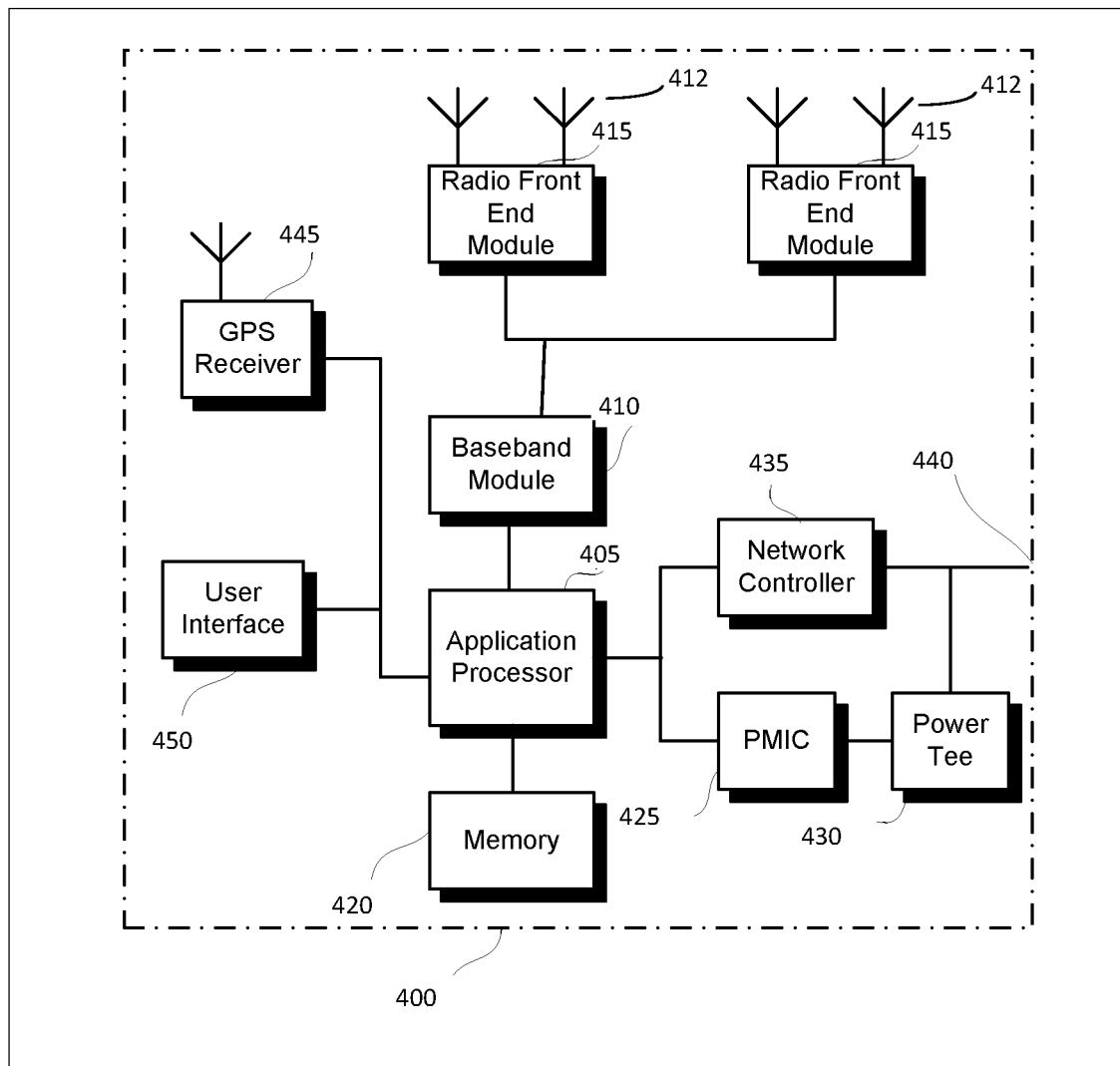
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
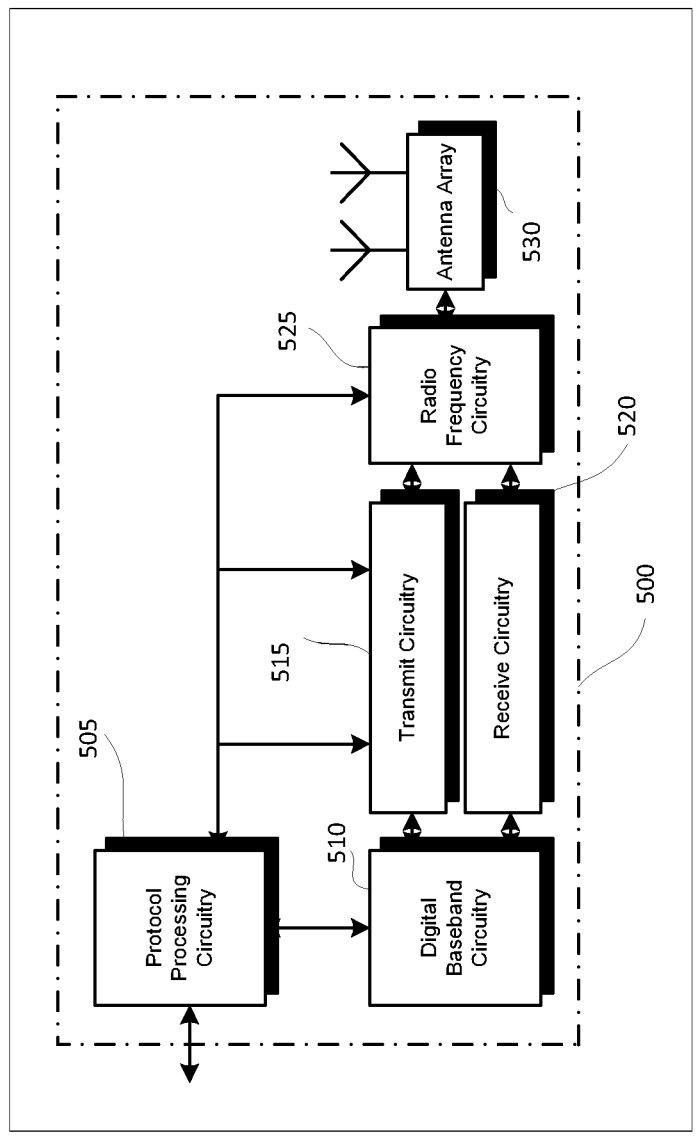
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
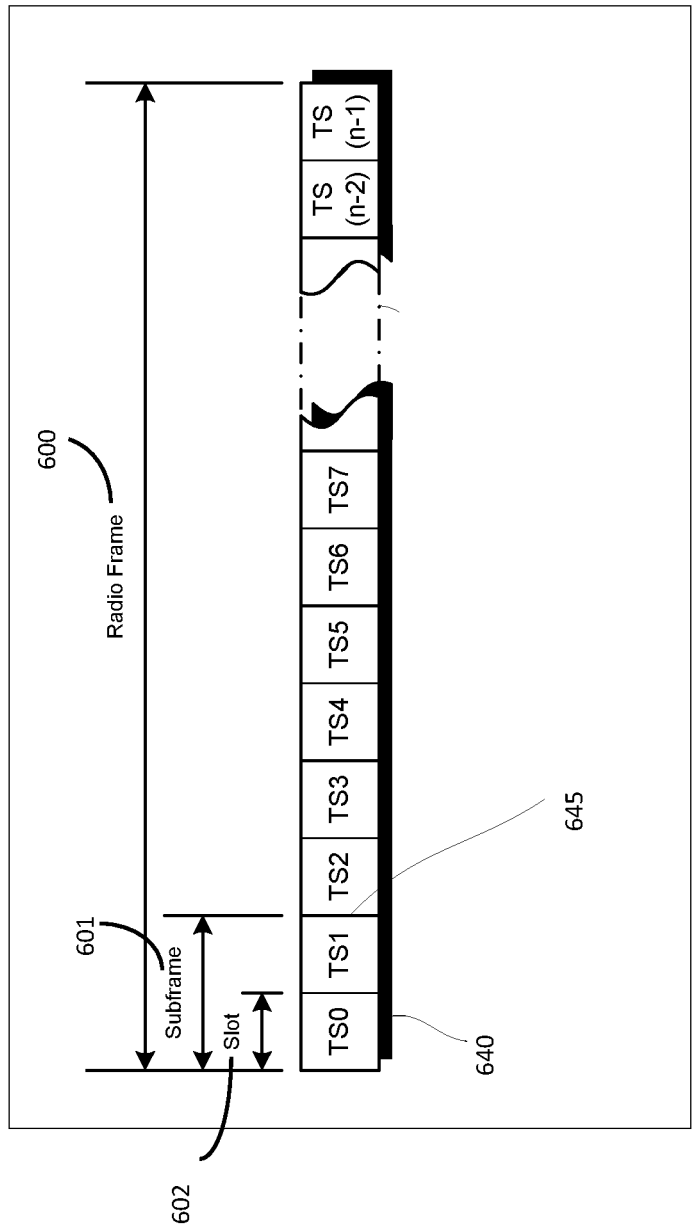
FIG. 6 illustrates an example of a radio frame structure in accordance with some embodiments.
Figures 7A, 7B:
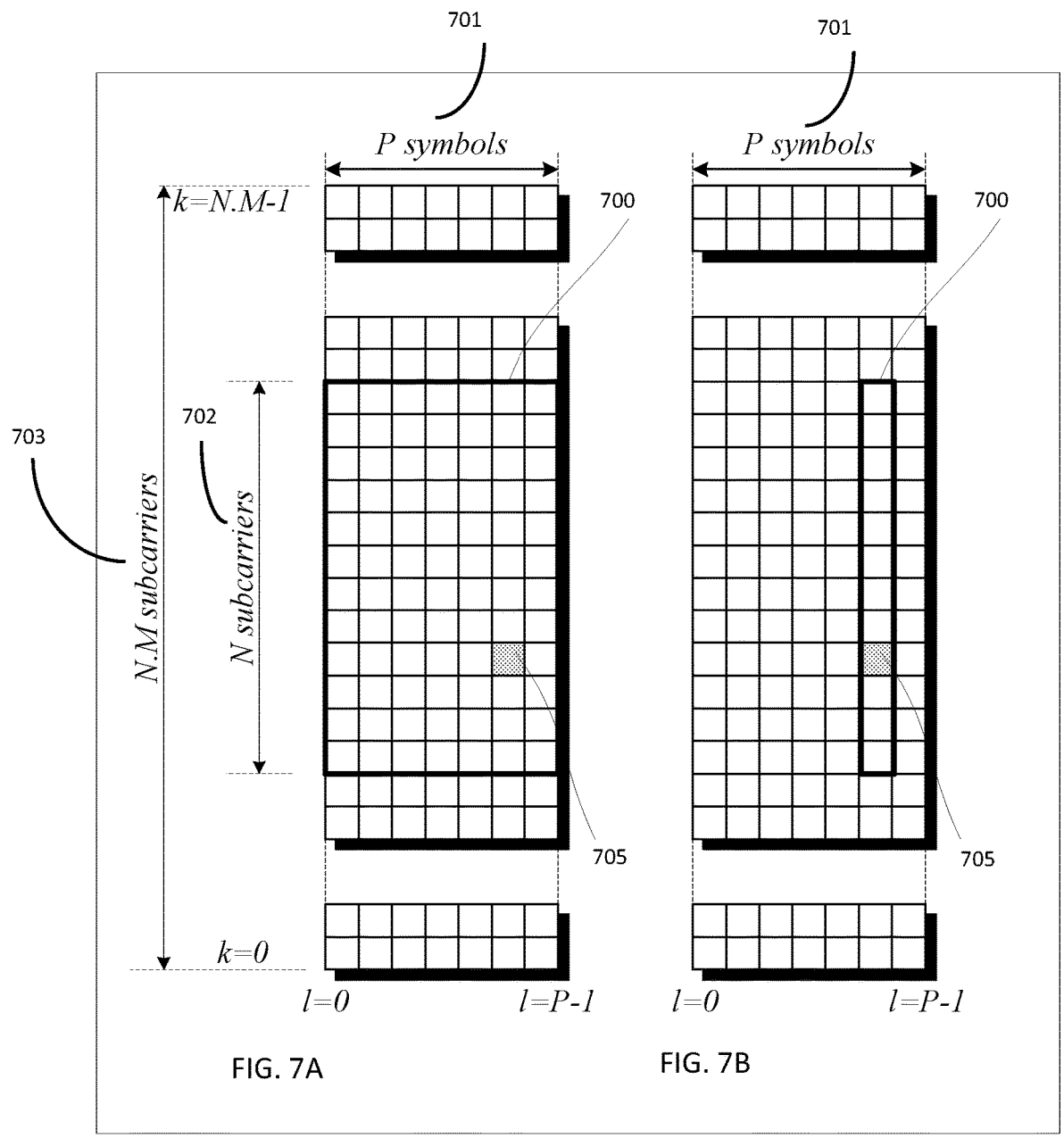
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, an apparatus of a UE 102 may comprise memory. The apparatus may further comprise processing circuitry. The processing circuitry may supports a medium access control (MAC) entity. The processing circuitry may be configured to decode radio resource control (RRC) signaling from a gNB 105. The RRC signaling may allocate one or more logical channels to one or more logical channel groups (LCG) for uplink transmissions. The processing circuitry may be further configured to decode an uplink grant for uplink shared channel (UL-SCH) data transmission by the UE 102. The processing circuitry may be further configured to, if uplink data for one of the logical channels becomes available to the MAC entity, determine whether to trigger a regular buffer status report (BSR) to provide the gNB 105 with information about uplink data volumes in the MAC entity, based at least partly on: a priority of the logical channel of the uplink data; and for the LCG to which the logical channel of the uplink data belongs, uplink data volumes of the logical channels of the LCG. The processing circuitry may be further configured to, if the regular BSR is triggered and a logical channel scheduling request (SR) delay timer is not running, and if available UL-SCH data resources do not meet one or more logical channel prioritization (LCP) mapping restrictions configured for the logical channel of the uplink data: trigger a scheduling request to request UL-SCH data resources for a new transmission of the uplink data. These embodiments are described in more detail below.

Figure 8:
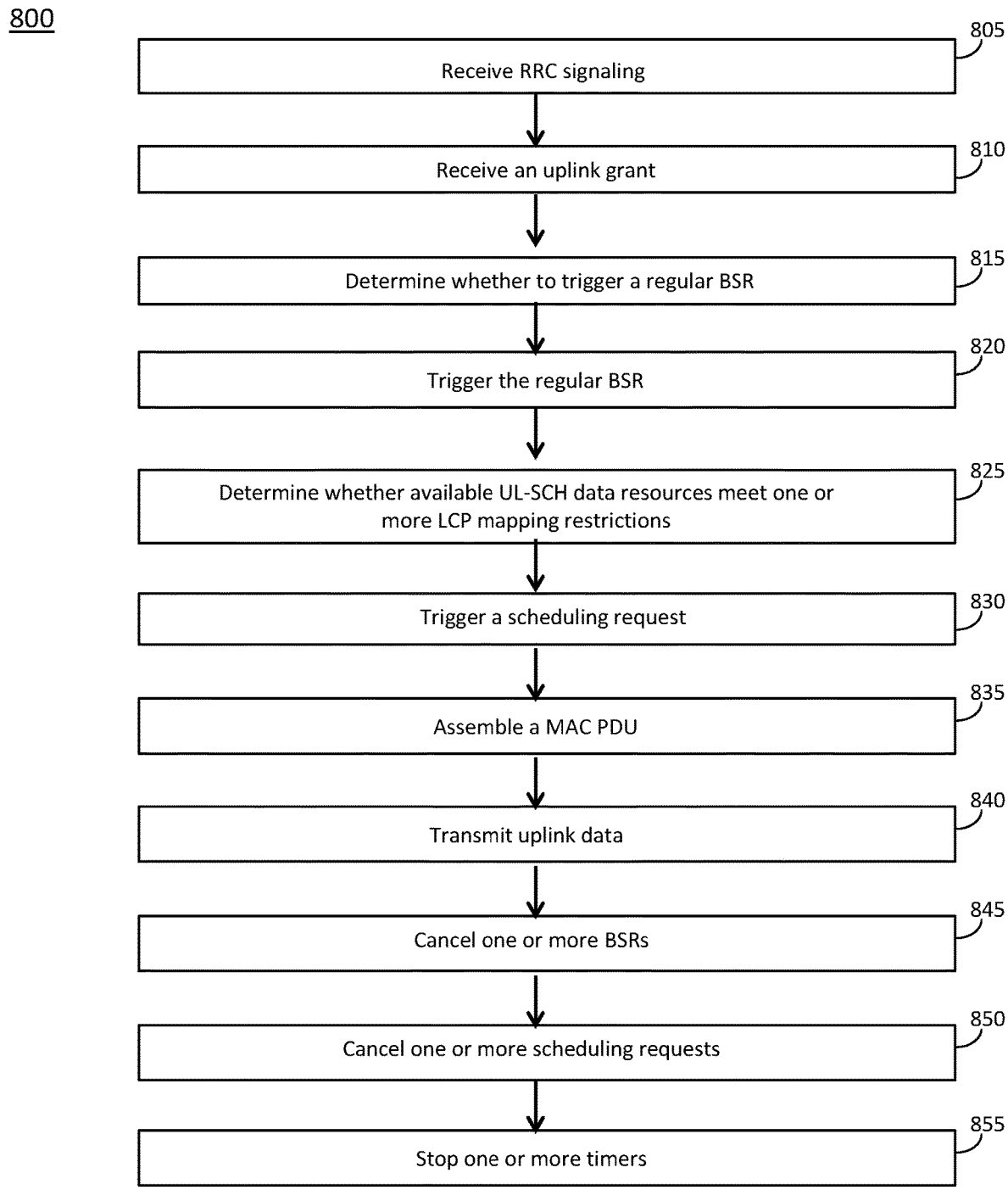
FIG. 8 illustrates the operation of a method of communication in accordance with some embodiments.
Figure 9:
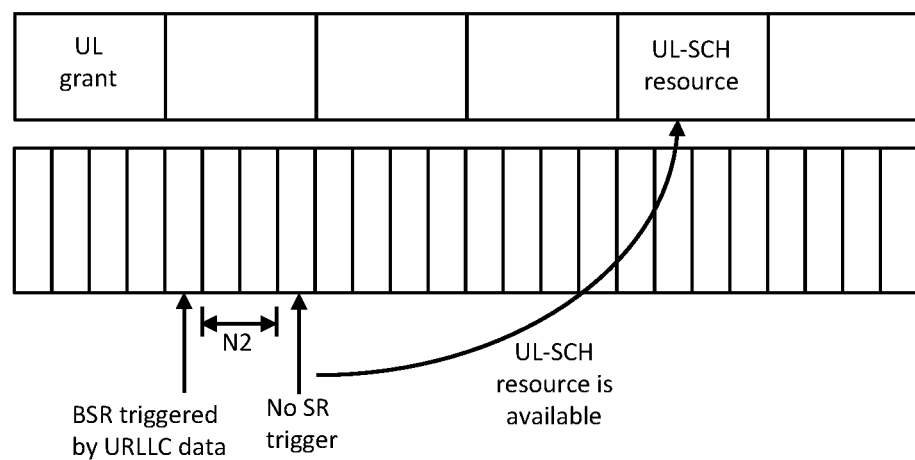
FIG. 9 illustrates example operations and elements in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to one or more figures, although it is understood that the method 800 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component (including but not limited to the gNB 105) may perform one or more operations of the method 800. In some embodiments, another device and/or component (including but not limited to the gNB 105) may perform one or more operations that may be similar to one or more operations of the method 800. In some embodiments, another device and/or component (including but not limited to the gNB 105) may perform one or more operations that may be reciprocal to one or more operations of the method 800. In a non-limiting example, the gNB 105 may perform an operation that may be the same as, similar to, reciprocal to and/or related to an operation of the method 800, in some embodiments.

It should be noted that one or more operations of the method 800 (and/or other method) may be the same as, similar to and/or reciprocal to one or more operations of another method. In a non-limiting example, an operation of the method 800 may include reception of an element (such as a frame, block, message and/or other) by the UE 102, and an operation of another method may include transmission of a same element (and/or similar element) by the gNB 105. In some cases, descriptions of operations and techniques of one method (such as 800 and/or others) may be relevant to other methods (such as 800 and/or others). Such technique and concepts may be related to RRC signaling, BSRs, scheduling requests, logical channels, LCP prioritization, triggering of BSR(s), triggering of scheduling request(s), cancellation of BSR(s), cancellation of scheduling request(s) and/or other techniques/concepts.

The method 800 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The method 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, parameters, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to those particular elements, as similar element(s) and/or alternate element(s) may be used, in some embodiments. The scope of embodiments is also not limited to usage of elements that are included in standards.

In some embodiments, the UE 102 may be arranged to operate in accordance with a new radio (NR) protocol. In some embodiments, the gNB 105 may be arranged to operate in accordance with an NR protocol.

In some embodiments, the UE 102 may support a medium access control (MAC) entity. In some embodiments, the UE 102 may comprise processing circuitry, and the processing circuitry may support the MAC entity. In some embodiments, the processing circuitry may: support the MAC entity; support one or more additional entities; perform additional functionality other than functionality of the MAC entity; and/or other.

At operation 805, the UE 102 may receive radio resource control (RRC) signaling. Embodiments are not limited to usage of RRC signaling in this operation or in other operations described herein, as other types of control signaling may be used in some embodiments.

In some embodiments, the UE 102 may receive the RRC signaling from the gNB 105, although the scope of embodiments is not limited in this respect. In some embodiments, the RRC signaling may allocate one or more logical channels to one or more logical channel groups (LCG) for uplink transmissions. In some embodiments, the RRC signaling may include information related to allocation of one or more logical channels to one or more LCGs for uplink transmissions.

In some embodiments, the RRC signaling may include information related to logical channel prioritization (LCP) mapping restrictions. Non-limiting examples of such information include, but are not limited to: one or more allowed-SCSlist parameters, one or more maxPUSCH-duration parameters, one or more configuredGrantType1Allowed parameters, and one or more allowedServingCells parameters. In some embodiments, the RRC signaling may include, for each logical channel: an allowed-SCSlist parameter, a maxPUSCH-duration parameter, a configuredGrantType1Allowed parameter, and an allowed-ServingCells parameter.

In some embodiments, the allowed-SCSlist parameter may set allowed subcarrier spacing(s) for transmission, although the scope of embodiments is not limited in this respect. In some embodiments, the maxPUSCH-duration parameter may set a maximum PUSCH duration for transmission, although the scope of embodiments is not limited in this respect.

In some embodiments, the RRC signaling may include multiple RRC messages, although the scope of embodiments is not limited in this respect. In some embodiments, multiple RRC messages may be used to communicate multiple elements. In a non-limiting example, a first RRC message may include information related to the allocation of the logical channels into LCGs, and a second RRC message may include information related to LCP mapping restrictions. The scope of embodiments is not limited to usage of multiple RRC messages to communicate multiple elements, however. An RRC message may include multiple elements, in some embodiments. For instance, one RRC message may include information related to the allocation of the logical channels into LCGs, and may also include information related to the LCP mapping restrictions, in some embodiments.

At operation 810, the UE 102 may receive an uplink grant. In some embodiments, the UE 102 may receive the uplink grant from the gNB 105, although the scope of embodiments is not limited in this respect. In some embodiments, the uplink grant may be for uplink data transmission and/or uplink shared channel (UL-SCH) data transmission by the UE 102. In some embodiments, the uplink grant may include information related to resources to be used for uplink data transmission and/or UL-SCH data transmission by the UE 102.

At operation 815, the UE 102 may determine whether to trigger a regular BSR. In some embodiments, the UE 102 may determine whether to trigger a BSR, including but not limited to a regular BSR. At operation 820, the UE 102 may trigger the regular BSR. In some embodiments, the UE 102 may trigger the regular BSR if it is determined that the UE is to trigger the BSR. In some embodiments, the UE 102 may trigger a BSR, including but not limited to a regular BSR.

In some embodiments, the BSR and/or regular BSR may be used to provide the gNB 105 with information about uplink data volumes in the MAC entity, although the scope of embodiments is not limited in this respect.

In some embodiments, the UE 102 may determine whether to trigger the regular BSR (and/or BSR) if uplink data for one of the logical channels becomes available to the MAC entity of the UE 102, although the scope of embodiments is not limited in this respect.

In some embodiments, uplink data for one of the logical channels may become available to the MAC entity of the UE 102. The UE 102 may determine whether to trigger the regular BSR (and/or BSR) based at least partly on one or more of: a priority of the logical channel of the uplink data; for the LCG to which the logical channel of the uplink data belongs: uplink data volumes of the logical channels of the LCG; and/or other.

In some embodiments, the UE 102 may determine to trigger the regular BSR (and/or BSR) if: the priority of the logical channel of the uplink data is higher than priorities of any logical channel containing available uplink data, for the logical channels of any of the LCGs; or for the logical channels of the LCG to which the logical channel of the uplink data belongs, none of the logical channels contains available uplink data.

In some embodiments, the UE 102 may, if uplink data for a logical channel becomes available to the MAC entity, determine whether to trigger the regular BSR (and/or BSR) based at least partly on whether a priority of the logical channel of the uplink data is higher than priorities of other logical channels.

In some embodiments, the UE 102 may, if uplink data for one of the logical channels becomes available to the MAC entity, determine whether to trigger the regular BSR (and/or BSR) based at least partly on the logical channel for the uplink data.

At operation 825, the UE 102 may determine whether available UL-SCH data resources meet one or more logical LCP mapping restrictions. At operation 830, the UE 102 may trigger a scheduling request. In some embodiments, the UE 102 may trigger the scheduling request to request UL-SCH data resources for a new transmission of the uplink data, although the scope of embodiments is not limited in this respect.

In some embodiments, the UE 102 may trigger the scheduling request if the regular BSR is triggered and a logical channel scheduling request (SR) delay timer is not running, and if available UL-SCH data resources do not meet one or more LCP mapping restrictions configured for the logical channel of the uplink data. In some embodiments, one or more additional conditions may be used to determine whether to trigger the scheduling request.

In some embodiments, may, if the regular BSR is triggered and a logical channel scheduling request (SR) delay timer is not running, trigger the scheduling request if: there are no UL-SCH data resources available for the new transmission; or if the MAC entity is configured with one or more configured uplink grants and a logicalChannelSR-Mask of the logical channel that triggered the regular BSR is set to false; or if UL-SCH data resources available for the new transmission do not meet one or more LCP mapping restrictions configured for the logical channel that triggered the BSR (and/or regular BSR).

In some embodiments, the UE 102 may trigger the scheduling request if the logical channel of the uplink data is not allowed to use the available UL-SCH data resources because the logical channel of the uplink data does not meet criteria related to: an allowed subcarrier spacing of the available UL-SCH data resources; a maximum PUSCH duration of the available UL-SCH data resource; and/or other.

In some embodiments, the UE 102 may determine that the available UL-SCH data resources meet the one or more LCP mapping restrictions if: a set of allowed subcarrier spacing index values in an allowed-SCSlist for the logical channel of the uplink data includes a subcarrier spacing index associated to the uplink grant; and a maxPUSCH-duration for the logical channel of the uplink data is larger than or equal to a physical uplink shared channel (PUSCH) transmission duration associated to the uplink grant. In some embodiments, the RRC signaling may include the allowed-SCSlist and/or the maxPUSCH-duration, although the scope of embodiments is not limited in this respect.

In some embodiments, the UE 102 may determine that the available UL-SCH data resources meet the one or more LCP mapping restrictions if: a set of allowed subcarrier spacing index values in an allowed-SCSlist for the logical channel of the uplink data includes a subcarrier spacing index associated to the uplink grant; a maxPUSCH-duration for the logical channel of the uplink data is larger than or equal to a physical uplink shared channel (PUSCH) transmission duration associated to the uplink grant; a configuredGrantType1Allowed for the logical channel of the uplink data is set to true in case the uplink grant is a configured grant Type 1; and allowedServingCells for the logical channel of the uplink data includes cell information associated to the uplink grant. In some embodiments, the RRC signaling may include the allowed-SCSlist, the maxPUSCH-duration, the configuredGrantType1Allowed and/or the allowedServingCells, although the scope of embodiments is not limited in this respect.

At operation 835, the UE 102 may assemble a MAC protocol data unit (PDU). At operation 840, the UE 102 may transmit uplink data. At operation 845, the UE 102 may cancel one or more BSRs. At operation 850, the UE 102 may cancel one or more scheduling requests. At operation 855, the UE 102 may stop one or more timers.

In some cases, one or more of operations 835-855 may be performed. Non-limiting examples are given below.

In some embodiments, the UE 102 may: assemble a MAC PDU for transmission; cancel all current pending SRs; and stop each respective sr-ProhibitTimer for the pending SRs at a later time when the MAC PDU is transmitted.

In some embodiments, the UE 102 may: assemble a MAC PDU for transmission; and cancel all BSRs triggered prior to assembly of the MAC PDU when the MAC PDU is transmitted.

In some embodiments, the UE 102 may: refrain from cancellation of the regular BSR or the triggered SR even if the UE 102 builds a MAC PDU including the regular BSR, provided that the logical channel of the uplink data is not allowed to use available UL-SCH resources for transmission of the MAC PDU.

In some embodiments, the UE 102 may: assemble a MAC PDU that includes the regular BSR; and cancel the regular BSR or the triggered SR at a later time when the UE 102 transmits the MAC PDU that includes the regular BSR.

In some embodiments, the UE 102 may: assemble a MAC PDU that includes the regular BSR; and cancel all current pending SRs and BSRs at a later time when the UE 102 transmits the MAC PDU that includes the regular BSR.

In some embodiments, the UE 102 may: assemble a MAC PDU for transmission; cancel all pending SRs triggered prior to assembly of the MAC PDU; stop each respective sr-ProhibitTimer for the pending SRs when the MAC PDU is transmitted; and cancel all BSRs triggered prior to assembly of the MAC PDU when the MAC PDU is transmitted.

In some embodiments, the uplink data may be UL-SCH data, although the scope of embodiments is not limited in this respect.

In some embodiments, the uplink grant may be for uplink transmission in accordance with an enhanced mobile broadband (eMBB) technique, and the uplink data may be for uplink transmission in accordance with an ultra-reliable low latency communication (URLLC) technique. In some embodiments, the uplink data may become available to the MAC entity after reception of the uplink grant. In some embodiments, a priority of uplink data to be transmitted in accordance with the URLLC technique may be higher than a priority of uplink data to be transmitted in accordance with the eMBB technique.

Embodiments are not limited to transmission in accordance with eMBB techniques or URLLC techniques, however. One or more of the techniques, operations and/or methods described herein may be applicable to uplink data and/or uplink transmissions of any suitable type(s) (including but not limited to eMBB and/or URLLC), in some embodiments.

In some embodiments, an apparatus of a UE 102 may comprise memory. The memory may be configurable to store information related to RRC signaling. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of RRC signaling. The apparatus may include a transceiver to receive RRC signaling. The transceiver may transmit and/or receive other blocks, messages and/or other elements.

FIGS. 9-12 illustrates example operations and elements in accordance with some embodiments. FIG. 13 illustrates an example information element (IE) in accordance with some embodiments. It should be noted that the examples shown in FIGS. 9-13 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-13. Although some of the elements shown in the examples of FIGS. 9-13 may be included in a 3GPP LTE standard, 5G standard, NR standard and/or other standard, embodiments are not limited to usage of such elements that are included in standards.

In some embodiments, a "new immediate transmission" or proposed "new transmission" could refer to the next available UL-SCH resource for MAC PDU transmission. In a non-limiting example, in the subclause 5.4.5 in Rel-15 TS 38.321 v2.0.0 of the 3GPP standard, "new immediate transmission" or proposed "new transmission" could refer to the next available UL-SCH resource for MAC PDU transmission.

In a non-limiting example scenario, URLLC data arrival takes place after a UL grant for eMBB service has been received. In this case, the LCH serving the URLLC service may trigger the BSR. The UL-SCH resource allocated by the UL grant may be considered available, which in turn may prevent the UE 102 from triggering SR for the URLLC services as given below in the text and in FIG. 9. In the non-limiting example 900 in FIG. 9, the SR is not triggered by the URLLC data.

In the text below, and in some descriptions herein, the notation of a number followed by a ">" symbol may be used as part of a logic structure, a logic hierarchy, an organization of some operations/conditions, an outline of an implementation, a level of indentation, a structure that includes different levels of indentation, pseudo-code and/or other, although the scope of embodiments is not limited in this respect.

In such structures described herein, embodiments are not limited to the ordering, numbering and other aspects of the elements of the structures. In some embodiments, a structure may not include all elements described. In some embodiments, a structure may include one or more additional elements. In some embodiments, a structure may include one or more elements that are similar to one or more elements of a structure described herein.

In addition, usage of the word "shall" is also not limiting in the text below and in some descriptions herein. The word "shall" may be used in some standards (such as 3GPP standards and/or other) and may indicate mandatory behavior. Some of the operations, techniques and/or concepts described herein may be described in a similar manner. It is understood, however, that some embodiments may be based on similar operations, techniques and/or concepts that do not necessarily include such mandatory behavior and also may not necessarily be described with the word "shall." For instance, some embodiments may include an operation in which the MAC entity shall start a timer. Some embodiments may include an operation in which: the MAC entity starts the timer, the MAC entity may start the timer and/or other.

In some embodiments, the following and/or similar may be used:

The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs; 3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set to false; or
3> if the UL-SCH resources available for a new transmission do not meet the LCP mapping restrictions (which may be described herein and/or included in subclause 5.4.3.1 of TS 38.321, although the scope of embodiments is not limited in this respect) configured for the logical channel that triggered the BSR:
4> trigger a Scheduling Request.

In some embodiments, UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

In some embodiments, the following and/or similar may be used:

The MAC entity shall:
1> if the Buffer Status reporting procedure determines that at least one BSR has been triggered and not cancelled:
2> if UL-SCH resources are available for a new immediate transmission:
3> instruct the Multiplexing and Assembly procedure to generate the BSR MAC CE(s);

3> start or restart periodicBSR-Timer except when all the generated BSRs are long or short Truncated BSRs;
3> start or restart retxBSR-Timer.
2> else if a Regular BSR has been triggered and logical-ChannelSR-DelayTimer is not running:
3> if an uplink grant is not a configured grant; or
3> if the Regular BSR was not triggered for a logical channel for which logical channel SR masking (logicalChannelSR-Mask) is setup by upper layers:
4> trigger a Scheduling Request.

In some cases, to meet the delay requirements for the URLLC services, it may be important that such services be allowed to trigger SR instead of relying on the UL resources of the eMBB services. However, this may be used, in some cases, to avoid the frequent triggering of SR requests when there is UL-SCH resource available to transmit BSR.

In some embodiments, one or more techniques, operations and/or methods may be used for allowing the trigger of SR and also transmission of such SR for the URLLC services to meet the delay requirement. In some embodiments, URLLC services may be assigned a highest priority logical channel for DRB and only this logical channel can trigger the SR. In some embodiments, URLLC services may be assigned a high priority (and/or a highest priority) logical channel for DRB and this logical channel may trigger the SR.

In some embodiments, triggering of SR may be performed. The MAC may not necessarily recognize the URLLC or eMBB services. It may recognize the logical channel ID which is serving the different services. It may be up to the gNB 105 to configure a particular logical channel to meet the requirement of the service it is serving. Therefore, the gNB 105 may dedicate a particular logical channel ID to the UE 102 for the purpose of serving such services. In some cases, this may result in special treatment of the logical channel. For example, the regular BSR triggered by such logical channel can trigger SR if no UL resources are available in the numerology/TTI that it is allowed to use.

In some embodiments, the SR may be triggered based at least partly on a priority of the LCH. If a UL-SCH resource is available for transmission of MAC PDU, only the BSR triggered by the highest priority LCH for DRB can trigger the scheduling request provided the LCH is not allowed to use the available UL-SCH resource. The gNB 105 may optionally assign a highest priority for such logical channel if the UE 102 is using high priority services like URLLC. A potential consequence of this mechanism is that the UE 102 may both include BSR in the MAC PDU to be transmitted in the currently available UL resource and trigger SR to request UL grant for the high priority service in the particular scenario described above. In this case, it may not necessarily be guaranteed that the UE 102 receives the response to the SR. Therefore, the UE 102 may include BSR MAC CE in the MAC PDU for the new UL resource in UL-SCH if received even though it has already decided to include the BSR MAC in the MAC PDU to transmit in the previously available UL-SCH resource. The BSR may reflect the status of the buffer after the MAC PDU is built. In some embodiments, the following may be used.
1> if the Buffer Status reporting procedure determines that at least one BSR has been triggered and not cancelled:
2> if UL-SCH resources are available for a new immediate transmission:
3> if at least one Regular BSR was triggered for a highest priority logical channel for DRB for which logical channel SR masking (logicalChannelSR-Mask) is not setup and available UL-SCH resource is not allowed to be used by upper layers:
4> trigger a Scheduling Request.
3> else
4> instruct the Multiplexing and Assembly procedure to generate the BSR MAC CE(s);
4> start or restart periodicBSR-Timer except when all the generated BSRs are long or short Truncated BSRs;
4> start or restart retxBSR-Timer.
2> else if a Regular BSR has been triggered and logical-ChannelSR-DelayTimer is not running:
3> if an uplink grant is not a configured grant; or
3> if the Regular BSR was not triggered for a logical channel for which logical channel SR masking (logicalChannelSR-Mask) is setup by upper layers:
4> trigger a Scheduling Request.

In some embodiments, the following may be used.
1> if the Buffer Status reporting procedure determines that at least one BSR has been triggered and not cancelled:
2> if UL-SCH resources are available for a new immediate transmission:
3> if at least one Regular BSR was triggered for a highest priority logical channel for DRB for which logical channel SR masking (logicalChannelSR-Mask) is not setup and available UL-SCH resource is not allowed to be used by upper layers:
4> trigger a Scheduling Request.
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> else if a Regular BSR has been triggered and logical-ChannelSR-DelayTimer is not running:
3> if an uplink grant is not a configured grant; or
3> if the Regular BSR was not triggered for a logical channel for which logical channel SR masking (logicalChannelSR-Mask) is setup by upper layers:
4> trigger a Scheduling Request.

In some embodiments, an information element (IE) may be defined in the configuration of logical channel to indicate a special LCH. The BSR triggered by such an LCH for DRB can trigger the scheduling request provided the LCH is not allowed to use any available UL-SCH resource. Such an LCH may be used to serve the URLLC services. In some embodiments, if the element "prioritizedSchedulingRequest" is set to TRUE, the LCH may triggers SR if a BSR is triggered. In some embodiments, if the element "prioritizedSchedulingRequest" is set to TRUE, the LCH always triggers SR if a BSR is triggered.

In some embodiments, an IE, including but not limited to a LogicalChannelConfig IE, may be used to configure the logical channel parameters. A non-limiting example of a LogicalChannelConfig IE 1300 is shown in FIG. 13. Embodiments are not limited to the order, arrangement, type, size or other aspects of the elements shown in the LogicalChannelConfig IE 1300. In some embodiments, the LogicalChannelConfig IE 1300 may not necessarily include all elements shown in FIG. 13. In some embodiments, the LogicalChannelConfig IE 1300 may include one or more elements not shown in FIG. 13. In some embodiments, the LogicalChannelConfig IE 1300 may include one or more elements that are similar to one or more elements shown in FIG. 13.

In some embodiments, the following may be used.
1> if the Buffer Status reporting procedure determines that at least one BSR has been triggered and not cancelled:
2> if UL-SCH resources are available for a new immediate transmission:

3> if at least one Regular BSR was triggered for a logical channel for which prioritizedSchedulingRequest is set and logical channel SR masking (logicalChannelSR-Mask) is not setup and available UL-SCH resource is not allowed to be used by upper layers:
4> trigger a Scheduling Request.
3> else
4> instruct the Multiplexing and Assembly procedure to generate the BSR MAC CE(s);
4> start or restart periodicBSR-Timer except when all the generated BSRs are long or short Truncated BSRs;
4> start or restart retxBSR-Timer.
2> else if a Regular BSR has been triggered and logicalChannelSR-DelayTimer is not running:
3> if an uplink grant is not a configured grant; or
3> if the Regular BSR was not triggered for a logical channel for which logical channel SR masking (logicalChannelSR-Mask) is setup by upper layers:
4> trigger a Scheduling Request.

In some embodiments, the following may be used.
1> if the Buffer Status reporting procedure determines that at least one BSR has been triggered and not cancelled:
2> if UL-SCH resources are available for a new immediate transmission:
3> if at least one Regular BSR was triggered for a logical channel for which prioritizedSchedulingRequest is set and logical channel SR masking (logicalChannelSR-Mask) is not setup and available UL-SCH resource is not allowed to be used by upper layers:
4> trigger a Scheduling Request.
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> else if a Regular BSR has been triggered and logicalChannelSR-DelayTimer is not running:
3> if an uplink grant is not a configured grant; or
3> if the Regular BSR was not triggered for a logical channel for which logical channel SR masking (logicalChannelSR-Mask) is setup by upper layers:
4> trigger a Scheduling Request.

In some embodiments, the BSR may be allowed to trigger the SR if the BSR was triggered by the LCH which is not allowed to use the available UL-SCH resources because it does not meet the criteria for lcp-allowedSCS and lcp-maxPUSCH-Duration associated with the UL-SCH resource. In some embodiments, the BSR may trigger the SR if the BSR was triggered by the LCH which is not allowed to use the available UL-SCH resources because it does not meet the criteria for lcp-allowedSCS and lcp-maxPUSCH-Duration associated with the UL-SCH resource. In some embodiments, the following may be used.
1> if the Buffer Status reporting procedure determines that at least one BSR has been triggered and not cancelled:
2> if UL-SCH resources are available for a new immediate transmission and are allowed to be used for the LCH that triggered the BSR:
4> instruct the Multiplexing and Assembly procedure to generate the BSR MAC CE(s);
4> start or restart periodicBSR-Timer except when all the generated BSRs are long or short Truncated BSRs;
4> start or restart retxBSR-Timer.
2> else if a Regular BSR has been triggered and logicalChannelSR-DelayTimer is not running:
3> if an uplink grant is not a configured grant; or 3> if the Regular BSR was not triggered for a logical channel for which logical channel SR masking (logicalChannelSR-Mask) is setup by upper layers:
4> trigger a Scheduling Request.

In some embodiments, an SR may be transmitted. In some cases, including some cases included in 3GPP standard TS 38.321, the triggered SR is cancelled if a BSR is included in the MAC PDU. For instance, from TS 38.321: "When an SR is triggered, it shall be considered as pending until it is cancelled. All pending SR(s) shall be cancelled and each respective sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission." This may indicate that even if the SR is triggered by the LCH serving the URLLC service, it is possible that this SR could be cancelled before transmission if the UE 102 builds a MAC PDU and includes BSR before the next PUCCH resource for the SR.

Figure 10:
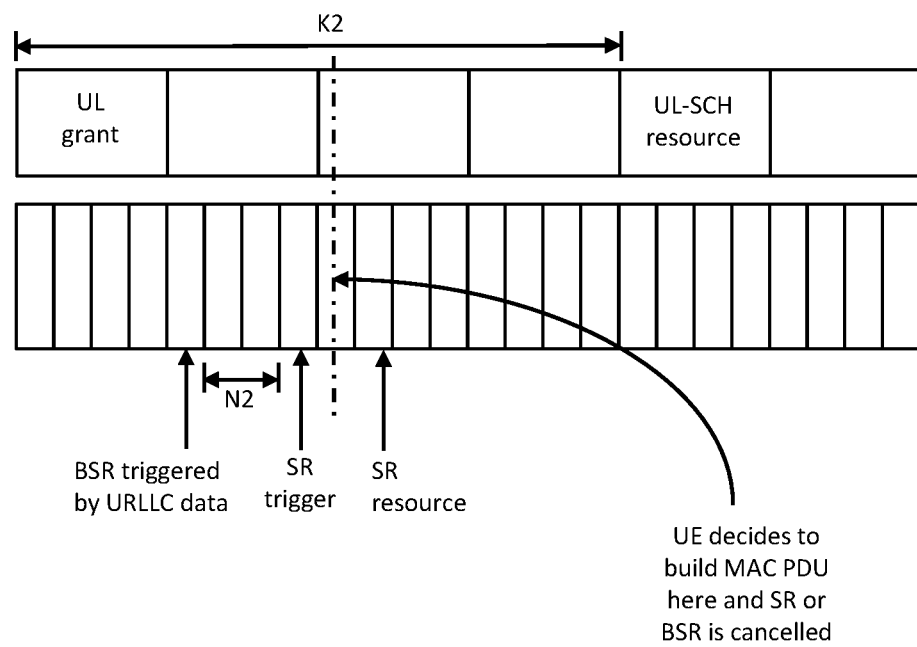
FIG. 10 illustrates example operations and elements in accordance with some embodiments.
Figure 11:
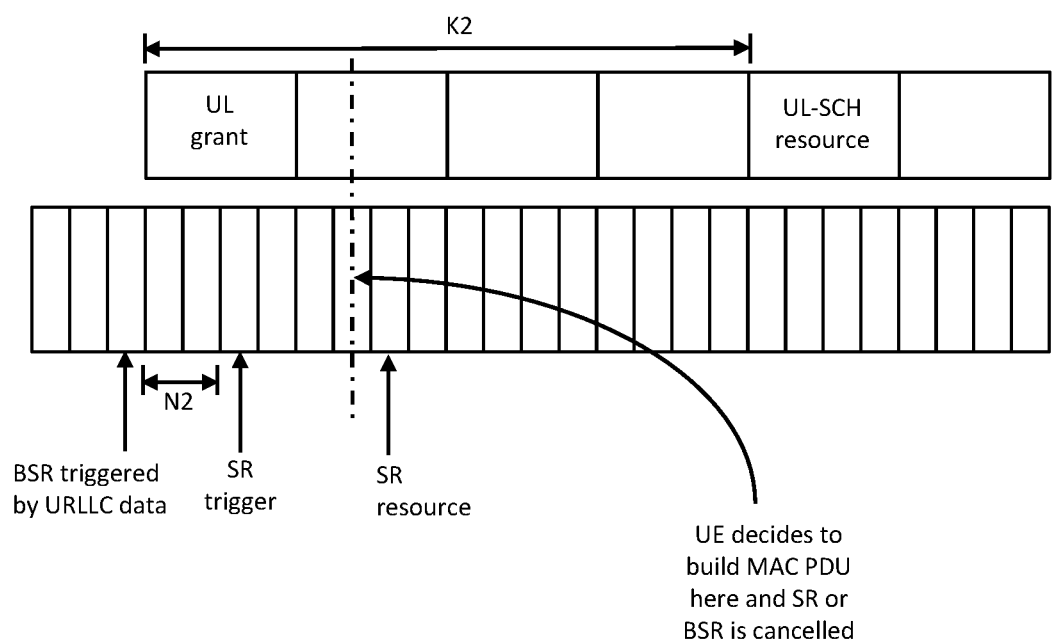
FIG. 11 illustrates example operations and elements in accordance with some embodiments.

Referring to FIG. 10 and FIG. 11, non-limiting example scenarios are shown in which the SR triggered by such LCH are cancelled. The scenarios 1000 and 1100 illustrate non-limiting example scenarios in which triggered BSR or SR is cancelled. Note that in some cases, the delay K2 may not meet the delay requirement for URLLC services and such cancellation of SR or BSR may be undesirable.

In some embodiments, when the UE 102 receives a UL grant and performs the LCP and decides which LCHs are selected to provide the available resources, the SR or BSR triggered by the LCH is not cancelled provided that this LCH did not meet the criteria for lcp-allowedSCS and lcp-maxPUSCH-Duration associated with the resource provided in the UL grant and this LCH also has highest priority or prioritizedSchedulingRequest is set to TRUE.

Figure 12:
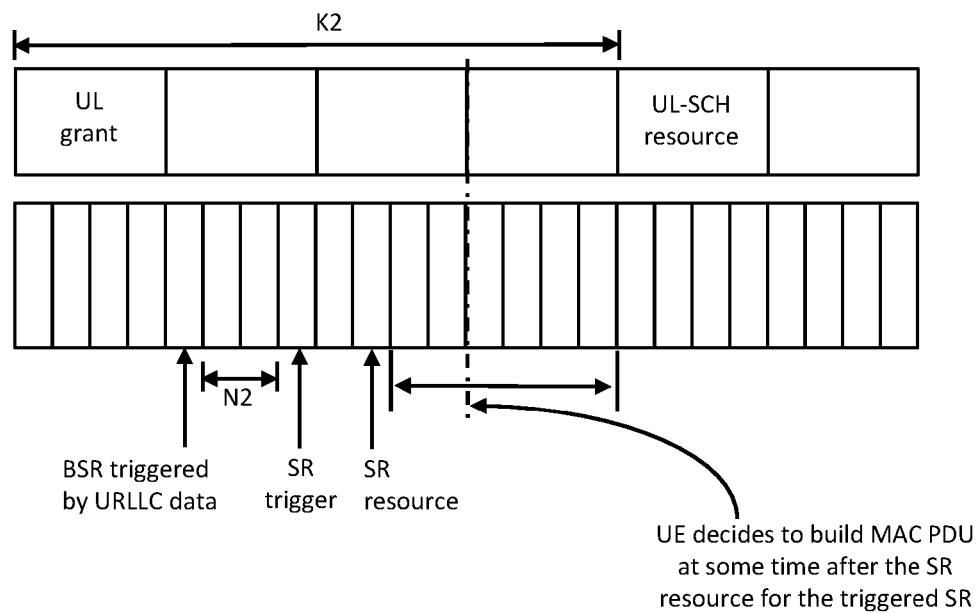
FIG. 12 illustrates example operations and elements in accordance with some embodiments.

In some embodiments, the UE 102 may delay building the MAC PDU until the next PUCCH transmission opportunity for the triggered SR if there is enough time before the next UL-SCH transmission opportunity and it detects that the LCH for which the priority is set to highest or prioritizedSchedulingRequest is set to TRUE. A non-limiting example 1200 is shown in FIG. 12. In the non-limiting example 1200 shown in FIG. 12, the UE 102 may avoid cancellation of the BSR or SR, in some cases.

In some embodiments, a periodic BSR with smallest periodicity may be configured. This may cause the periodic BSR to be triggered frequently, in some cases. Only if the LCH, for which the priority is set to highest or prioritizedSchedulingRequest is set to TRUE, is allowed to trigger SR if the LCH has data available.

In some embodiments, a method of triggering SR by a LCH which is serving the URLLC services may be performed. In some embodiments, the LCH may be of highest priority for a DRB. In some embodiments, the LCH may be identified by an IE, for example "prioritizedSchedulingRequest" is set to TRUE, when the LCH is configured. In some embodiments, the LCH may trigger a scheduling request if this LCH triggered a regular BSR, has no logical channel SR masking (logicalChannelSR-Mask) setup and is not allowed to use currently available UL-SCH resource for MAC PDU transmission. In some embodiments, a method may be performed of triggering SR by the LCH which triggered a BSR, is not allowed to use the available UL-SCH resources because the LCH does not meet the criteria for lcp-allowedSCS and lcp-maxPUSCH-Duration associated with the UL-SCH resource. In some embodiments, a method of triggering SR by the LCH may be performed. In some embodiments, a method of transmitting SR by an LCH which is serving the URLLC service may be performed. In some embodiments, the BSR or SR triggered by the LCH is not cancelled even if the UE 102 builds a MAC PDU including BSR provided that the LCH is not allowed to use currently available UL-SCH resource for MAC PDU transmission. In some embodiments, the UE 102 may delay building the MAC PDU until the next PUCCH transmission opportunity for the SR triggered by the LCH if there is enough time to build a MAC PDU before the next UL-SCH transmission opportunity.

In Example 1, an apparatus of a User Equipment (UE) may comprise memory. The apparatus may further comprise processing circuitry. The processing circuitry may support a medium access control (MAC) entity. The processing circuitry may be configured to decode radio resource control (RRC) signaling from a Next Generation Node-B (gNB), wherein the RRC signaling allocates one or more logical channels to one or more logical channel groups (LCG) for uplink transmissions. The processing circuitry may be further configured to decode an uplink grant for uplink shared channel (UL-SCH) data transmission by the UE. The processing circuitry may be further configured to, if uplink data for one of the logical channels becomes available to the MAC entity, determine whether to trigger a regular buffer status report (BSR) to provide the gNB with information about uplink data volumes in the MAC entity. The processing circuitry may be further configured to, if the regular BSR is triggered and a logical channel scheduling request (SR) delay timer is not running, and if available UL-SCH data resources do not meet one or more logical channel prioritization (LCP) mapping restrictions configured for the logical channel of the uplink data: trigger a scheduling request to request UL-SCH data resources for a new transmission of the uplink data.

In Example 2, the subject matter of Example 1, wherein the processing circuitry may be further configured to determine that the available UL-SCH data resources meet the one or more LCP mapping restrictions if: a set of allowed subcarrier spacing index values in an allowed-SCSlist for the logical channel of the uplink data includes a subcarrier spacing index associated to the uplink grant, wherein the allowed-SCSlist may be included in the RRC signaling; and a maxPUSCH-duration for the logical channel of the uplink data is larger than or equal to a physical uplink shared channel (PUSCH) transmission duration associated to the uplink grant, wherein the maxPUSCH-duration may be included in the RRC signaling.

In Example 3, the subject matter of one or any combination of Examples 1-2, wherein the processing circuitry may be further configured to determine that the available UL-SCH data resources meet the one or more LCP mapping restrictions further if: a configuredGrantType1Allowed for the logical channel of the uplink data is set to true in case the uplink grant is a configured grant Type 1, wherein the configuredGrantType1Allowed may be included in the RRC signaling; and allowedServingCells for the logical channel of the uplink data includes cell information associated to the uplink grant, wherein the allowedServingCells may be included in the RRC signaling.

In Example 4, the subject matter of one or any combination of Examples 1-3, wherein the RRC signaling may include, for each logical channel: an allowed-SCSlist, and a maxPUSCH-duration.

In Example 5, the subject matter of one or any combination of Examples 1-4, wherein the processing circuitry may be further configured to trigger the scheduling request if the logical channel of the uplink data is not allowed to use the available UL-SCH data resources because the logical channel of the uplink data does not meet criteria related to: an allowed subcarrier spacing of the available UL-SCH data resources; and a maximum PUSCH duration of the available UL-SCH data resources.

In Example 6, the subject matter of one or any combination of Examples 1-5, wherein the processing circuitry may be further configured to determine to trigger the regular BSR if: the priority of the logical channel of the uplink data is higher than priorities of any logical channel containing available uplink data, for the logical channels of any of the LCGs; or for the logical channels of the LCG to which the logical channel of the uplink data belongs, none of the logical channels contains available uplink data.

In Example 7, the subject matter of one or any combination of Examples 1-6, wherein the processing circuitry may be further configured to assemble a MAC protocol data unit (PDU) for transmission. The processing circuitry may be further configured to cancel all current pending SRs. The processing circuitry may be further configured to stop each respective sr-ProhibitTimer for the pending SRs at a later time when the MAC PDU is transmitted.

In Example 8, the subject matter of one or any combination of Examples 1-7, wherein the processing circuitry may be further configured to assemble a MAC protocol data unit (PDU) for transmission. The processing circuitry may be further configured to cancel all BSRs triggered prior to assembly of the MAC PDU when the MAC PDU is transmitted.

In Example 9, the subject matter of one or any combination of Examples 1-8, wherein the uplink grant may be for uplink transmission in accordance with an enhanced mobile broadband (eMBB) technique. The uplink data may be for uplink transmission in accordance with an ultra-reliable low latency communication (URLLC) technique. The uplink data may become available to the MAC entity after reception of the uplink grant.

In Example 10, the subject matter of one or any combination of Examples 1-9, wherein a priority of uplink data to be transmitted in accordance with the URLLC technique may be higher than a priority of uplink data to be transmitted in accordance with the eMBB technique.

In Example 11, the subject matter of one or any combination of Examples 1-10, wherein the processing circuitry may be further configured to refrain from cancellation of the regular BSR or the triggered SR even if the UE builds a medium access control (MAC) protocol data unit (PDU) including the regular BSR, provided that the logical channel of the uplink data is not allowed to use available UL-SCH resources for transmission of the MAC PDU.

In Example 12, the subject matter of one or any combination of Examples 1-11, wherein the processing circuitry may be further configured to assemble a medium access control (MAC) protocol data unit (PDU) that includes the regular BSR. The processing circuitry may be further configured to cancel the regular BSR or the triggered SR at a later time when the UE transmits the MAC PDU that includes the regular BSR.

In Example 13, the subject matter of one or any combination of Examples 1-12, wherein the processing circuitry may be further configured to assemble a medium access control (MAC) protocol data unit (PDU) that includes the regular BSR. The processing circuitry may be further configured to cancel all current pending SRs and BSRs at a later time when the UE transmits the MAC PDU that includes the regular BSR.

In Example 14, the subject matter of one or any combination of Examples 1-13, wherein the UE may be arranged to operate in accordance with a new radio (NR) protocol.

In Example 15, the subject matter of one or any combination of Examples 1-14, wherein the apparatus may include a transceiver to receive the RRC signaling. The processing circuitry may include a baseband processor to decode the RRC signaling. The memory may be configured to store information related to the RRC signaling.

In Example 16, a non-transitory computer-readable storage medium may store instructions for execution by processing circuitry of a User Equipment (UE). The operations may configure the processing circuitry to decode an uplink grant for uplink shared channel (UL-SCH) data transmission by the UE. The operations may further configure the processing circuitry to, if uplink data for a logical channel becomes available to the MAC entity: determine whether to trigger a regular buffer status report (BSR) based at least partly on whether a priority of the logical channel of the uplink data is higher than priorities of other logical channels. The operations may further configure the processing circuitry to, if the regular BSR is triggered and a logical channel scheduling request (SR) delay timer is not running, and if available UL-SCH data resources do not meet one or more logical channel prioritization (LCP) mapping restrictions configured for the logical channel of the uplink data: trigger a scheduling request to request UL-SCH data resources for a new transmission of the uplink data. The one or more LCP mapping restrictions may be based on: a subcarrier spacing index associated to the uplink grant, and a physical uplink shared channel (PUSCH) transmission duration associated to the uplink grant.

In Example 17, the subject matter of Example 16, wherein the operations may further configure the processing circuitry to determine that the available UL-SCH data resources meet the one or more LCP mapping restrictions further if: a set of allowed subcarrier spacing index values in an allowed-SCSlist for the logical channel of the uplink data includes the subcarrier spacing index associated to the uplink grant; and a maxPUSCH-duration for the logical channel of the uplink data is larger than or equal to the PUSCH transmission duration associated to the uplink grant.

In Example 18, the subject matter of one or any combination of Examples 16-17, wherein the operations may further configure the processing circuitry to assemble a MAC protocol data unit (PDU) for transmission. The operations may further configure the processing circuitry to cancel all pending SRs triggered prior to assembly of the MAC PDU. The operations may further configure the processing circuitry to stop each respective sr-ProhibitTimer for the pending SRs when the MAC PDU is transmitted. The operations may further configure the processing circuitry to cancel all BSRs triggered prior to assembly of the MAC PDU when the MAC PDU is transmitted.

In Example 19, an apparatus of a User Equipment (UE) may comprise memory. The apparatus may further comprise processing circuitry. The processing circuitry may support a medium access control (MAC) entity. The processing circuitry may be configured to decode radio resource control (RRC) signaling from a Next Generation Node-B (gNB). The RRC signaling may allocate one or more logical channels to one or more logical channel groups (LCG) for uplink transmissions. The processing circuitry may be further configured to, if uplink data for one of the logical channels becomes available to the MAC entity: determine whether to trigger a regular buffer status report (BSR) based at least partly on the logical channel for the uplink data. The processing circuitry may be further configured to, if the regular BSR is triggered and a logical channel scheduling request (SR) delay timer is not running, trigger a scheduling request to request uplink shared channel (UL-SCH) data resources for a new transmission of the uplink data if: there are no UL-SCH data resources available for the new transmission; or if the MAC entity is configured with one or more configured uplink grants and a logicalChannelSR-Mask of the logical channel that triggered the regular BSR is set to false; or if UL-SCH data resources available for the new transmission do not meet one or more logical channel prioritization (LCP) mapping restrictions configured for the logical channel that triggered the BSR.

In Example 20, the subject matter of Example 19, wherein the processing circuitry may be further configured to decode an uplink grant for UL-SCH data transmission by the UE. The one or more LCP mapping restrictions may be based on: a subcarrier spacing index associated to the uplink grant; and a physical uplink shared channel (PUSCH) transmission duration associated to the uplink grant.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
  one or more processors, wherein the one or more processors are configured cause a base station to:
    transmit radio resource control (RRC) signaling to a user equipment (UE), wherein the RRC signaling includes a first element indicating one or more parameters for buffer status reporting and a second element allocating one or more logical channels to one or more logical channel groups (LCGs), wherein the buffer status reporting provides information about uplink data volume in a medium access control (MAC) entity of the UE;
    transmit an uplink grant for uplink shared channel (UL-SCH) transmission by the UE; and
    receive a scheduling request (SR) to request UL-SCH resources for a new transmission of uplink data, wherein the SR is triggered at the UE when:
      a regular buffer status report (BSR) is triggered at the UE in response to the uplink data for one of the one or more logical channels becoming available to the MAC entity and the uplink data belongs to a logical channel with a higher priority than a priority of another logical channel containing other available UL data; and
      a logical channel scheduling request (SR) delay timer is not running and available UL-SCH resources do not meet one or more logical channel prioritization (LCP) mapping restrictions configured for the logical channel that triggered the regular BSR.

2. The apparatus of claim 1, wherein the available UL-SCH resources meet the one or more LCP mapping restrictions when:
  a set of allowed subcarrier spacing index values in an allowed list for the logical channel that triggered the regular BSR includes a subcarrier spacing index associated with the uplink grant, wherein the allowed list is indicated by the RRC signaling, and a maxPUSCH-duration for the logical channel that triggered the regular BSR is larger than or equal to a physical uplink shared channel (PUSCH) transmission duration associated with the uplink grant, wherein the maxPUSCH-duration is indicated by the RRC signaling.

3. The apparatus of claim 2, wherein the available UL-SCH resources meet the one or more LCP mapping restrictions further when:
a configured Grant Type Allowed for the logical channel that triggered the regular BSR is set to true, the configured Grant Type Allowed indicated in the RRC signaling, and allowed Serving Cells for the logical channel that triggered the regular BSR includes cell information associated with the uplink grant, the allowed Serving Cells indicated in the RRC signaling.

4. The apparatus of claim 2, wherein the RRC signaling includes, for each logical channel,
an allowed-SCSlist; and
a maxPUSCH-duration.

5. The apparatus of claim 2, wherein the scheduling request is received when the logical channel of the uplink data is not allowed to use the available UL-SCH resources because the logical channel of the uplink data does not meet criteria related to:
an allowed subcarrier spacing of the available UL-SCH resources, and
a maximum PUSCH duration of the available UL-SCH resources.

6. The apparatus of claim 1, wherein the regular BSR is triggered when, for the logical channels of the LCG to which the logical channel of the uplink data belongs, none of the logical channels contains available uplink data.

7. A method for operating a cellular network, comprising:
transmitting radio resource control (RRC) signaling to a User equipment (UE), wherein the RRC signaling includes a plurality of LogicalChannelConfig information elements (IEs) for assigning one or more logical channel group IDs to a plurality of logical channels, wherein a first LogicalChannelConfig (IE) includes a logicalChannelSR-DelayTimerApplied element for a first logical channel;
transmitting an uplink grant for uplink shared channel (UL-SCH) transmission by the UE; and
receiving a scheduling request (SR) to request UL-SCH resources for a new transmission of uplink data, wherein the SR is triggered at the UE when:
a regular buffer status report (BSR) is triggered and not canceled at the UE in response to the uplink data for one of the plurality of logical channels becoming available to a medium access control (MAC) entity of the UE wherein the first logical channel has a higher priority than a priority of any of the other of the plurality of logical channels containing other available UL data; and
a logical channel scheduling request (SR) delay timer is not running and available UL-SCH resources do not meet one or more logical channel prioritization (LCP) mapping restrictions configured for the logical channel that triggered the regular BSR.

8. The method of claim 7, wherein the LCP mapping restrictions include one or more of allowed subcarrier spacing(s) and maximum physical uplink shared channel (PUCSH) duration.

9. The method of claim 7, wherein the regular BSR provides information about uplink data volume in the MAC entity of the UE.

10. The method of claim 7, wherein the available UL-SCH resources meet the one or more LCP mapping restrictions when:
a set of allowed subcarrier spacing index values in an allowed list for the logical channel that triggered the regular BSR includes a subcarrier spacing index associated with the uplink grant, wherein the allowed list is indicated by the RRC signaling, and
a maxPUSCH-duration for the logical channel that triggered the regular BSR is larger than or equal to a physical uplink shared channel (PUSCH) transmission duration associated with the uplink grant, wherein the maxPUSCH-duration is indicated by the RRC signaling.

11. The method of claim 7, wherein the available UL-SCH resources meet the one or more LCP mapping restrictions further when:
a configured Grant Type Allowed for the logical channel that triggered the regular BSR is set to true, the configured Grant Type Allowed indicated in the RRC signaling, and allowed Serving Cells for the logical channel that triggered the regular BSR includes cell information associated with the uplink grant, the allowed Serving Cells indicated in the RRC signaling.

12. The method of claim 7, wherein the RRC signaling includes, for each logical channel,
an allowed-SCSlist; and
a maxPUSCH-duration.

13. The method of claim 7, wherein the regular BSR is triggered when, for the logical channels of the LCG to which the logical channel of the uplink data belongs, none of the logical channels contains available uplink data.

14. An apparatus, the apparatus comprising:
one or more processors, wherein the one or more processors are configured to cause a user equipment (UE) to:
receive radio resource control (RRC) signaling from a base station, wherein the RRC signaling includes a plurality of LogicalChannelConfig information elements (IEs) for assigning one or more logical channel group IDs to a plurality of logical channels, wherein a first LogicalChannelConfig (IE) includes a logicalChannelSR-DelayTimerApplied element for a first logical channel, and
receive an uplink grant for uplink shared channel (UL-SCH) transmission by the UE; and
trigger, at a medium access control (MAC) entity of the UE, a regular buffer status report (BSR) if uplink data for the first logical channel becomes available to the MAC entity, wherein the first logical channel has a higher priority than a priority of any of the other of the plurality of logical channels containing other available UL data; and
if the regular BSR is triggered, trigger a scheduling request (SR) at the MAC entity to request UL-SCH resources for a new transmission of the uplink data if a logical channel scheduling request (SR) delay timer is not running and if available UL-SCH resources do not meet one or more logical channel prioritization (LCP) mapping restrictions configured for the logical channel that triggered the regular BSR.

15. The apparatus of claim 14, wherein the LCP mapping restrictions include one or more of allowed subcarrier spacing(s) and maximum physical uplink shared channel (PUCSH) duration.

16. The apparatus of claim 14, wherein the regular BSR provides information about uplink data volume in the MAC entity of the UE.

17. The apparatus according to claim 14, wherein the one or more processors are further configured to:
   assemble a MAC protocol data unit (PDU) for transmission;
      cancel all pending SRs triggered prior to assembly of the MAC PDU; and
      stop each respective sr-ProhibitTimer for the pending SRs when the MAC PDU is transmitted.

18. The apparatus according to claim 14, wherein the one or more processors are further configured to:
   assemble a MAC protocol data unit (PDU) for transmission; and
   cancel all BSRs triggered prior to assembly of the MAC PDU when the MAC PDU is transmitted.

19. The apparatus according to claim 14, wherein the one or more processors are further configured to:
   refrain from cancellation of the regular BSR or the triggered SR even if the UE builds a medium access control (MAC) protocol data unit (PDU) including the regular BSR, provided that the logical channel of the uplink data is not allowed to use available UL-SCH resources for transmission of the MAC PDU.

20. The apparatus according to claim 14, wherein the one or more processors are configured to:
   assemble a medium access control (MAC) protocol data unit (PDU) that includes the regular BSR; and
   cancel the regular BSR or the triggered SR at a later time when the UE transmits the MAC PDU that includes the regular BSR.

* * * * *